US007624099B2

(12) United States Patent
Katariya et al.

(10) Patent No.: US 7,624,099 B2
(45) Date of Patent: Nov. 24, 2009

(54) CLIENT-SERVER WORD-BREAKING FRAMEWORK

(75) Inventors: Sanjeev Katariya, Bellevue, WA (US); William D. Ramsey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 565 days.

(21) Appl. No.: 11/249,623

(22) Filed: Oct. 13, 2005

(65) Prior Publication Data

US 2007/0088677 A1    Apr. 19, 2007

(51) Int. Cl.
 G06F 17/28   (2006.01)
 G06F 17/27   (2006.01)
(52) U.S. Cl. .................................. 707/3; 707/4; 704/9
(58) Field of Classification Search ............... 704/1–10; 707/10, 3, 4
See application file for complete search history.

(56) References Cited

U.S. PATENT DOCUMENTS

| 6,604,075 | B1 * | 8/2003 | Brown et al. ............. 704/270.1 |
| 7,209,915 | B1 * | 4/2007 | Taboada et al. ................. 707/3 |
| 7,392,253 | B2 * | 6/2008 | Gursky et al. ................... 707/9 |
| 2003/0130835 | A1 * | 7/2003 | Azzam et al. .................... 704/1 |
| 2004/0167770 | A1 * | 8/2004 | Zhuo et al. ...................... 704/4 |
| 2004/0176954 | A1 * | 9/2004 | Wang .......................... 704/254 |
| 2005/0086049 | A1 * | 4/2005 | Bennett .......................... 704/4 |
| 2005/0091031 | A1 * | 4/2005 | Powell et al. .................... 704/4 |
| 2005/0131872 | A1 * | 6/2005 | Calbucci et al. ................. 707/3 |
| 2005/0197829 | A1 * | 9/2005 | Okumura ...................... 704/10 |
| 2006/0047500 | A1 * | 3/2006 | Humphreys et al. ............ 704/9 |

OTHER PUBLICATIONS

Killelea "Web performance tuning", Chapter 6.2, Publisher O'Reilly, 1998.*

* cited by examiner

*Primary Examiner*—Richemond Dorvil
*Assistant Examiner*—Jialong He
(74) *Attorney, Agent, or Firm*—Westman, Champlin & Kelly, P.A.

(57) ABSTRACT

Word-breaking of a query from a client machine in a client-server environment includes determining whether to use a first word breaking module operable with a client machine in the client-server environment and/or a second word breaking module operable with a server in the client-server environment.

16 Claims, 8 Drawing Sheets

CLIENT-SERVER WORD-BREAKING FRAMEWORK

BACKGROUND

The discussion below is merely provided for general background information and is not intended to be used as an aid in determining the scope of the claimed subject matter.

Word-breaking is the decomposition of text into individual test tokens, or words. Many languages, especially those with Roman alphabets, have an array of word separators (such as a space) and punctuation that are used to determine words, phrases and sentences. Word-breakers rely on accurate language heuristics to provide reliable and accurate results.

Information Retrieval (IR) performs word-breaking in order to match terms in a query with documents or other information in a database. A query is a formal statement of information needs that are put to an IR system by the user. In many applications, IR is performed by using a word-breaker to convert text in a document to tokens, the tokens of which are indexed for fast retrieval and/or to conduct statistical analysis of token frequencies.

When performing IR, it is important that the word-breaker is used for IR indexing match the word-breaker used to break the query. For example, suppose that the word-breaking of "I want a flight to Boulder, Colo." at indexing IR time produced the token set ("I", "want", "a", "flight", "to", "Boulder", ",", "Colo."). Suppose also that a "different" word-breaker used on a client machine produced a set of tokens ("I", "want", "a", "flight", "to", "Boulder,", "Colo.").

The performance of the IR system would be hampered under this scenario because upon receipt and using the set of tokens generated by the client machine, which includes the word token "Boulder,", this token would not generate the proper result because the index used by the IR system contains "Boulder" (i.e. no comma).

Occasionally, it is necessary in a client-server configuration for the client machine or device to perform word-breaking, or at least have access to the tokens generated either for performance reasons, or because the client machine has access to specific data on the client machine that is not available on a server. For instance, the client machine may have a unique list of people and corresponding email aliases, the list of which would not be available to a server. If word-breaking is performed by the client machine, yet the tokens generated are used by a server, the problem discussed above must be avoided.

SUMMARY

This Summary is provided to introduce some concepts in a simplified form that are further described below in the Detailed Description. This Summary is not intended to identify key features or essential features of the claimed subject matter, nor is it intended to be used as an aid in determining the scope of the claimed subject matter.

A framework is provided for ensuring that queries provided by a client can be processed to realize the task intended in a client-server environment. In particular, a method is provided to determine where word-breaking is to be performed using explicit or implicit agreements. Named entity recognition can then be performed on the tokens generated from the query, where for example the tokens can be provided to the client machine for named entity recognition thereon for data unique or otherwise not known to the server.

DETAILED DESCRIPTION

One aspect of the concepts herein described provides a client-server word-breaking framework wherein a client and a server explicitly or implicitly form an agreement about the word-breakers used in order to provide a consistent indexing and information retrieval environment.

Figure 4:
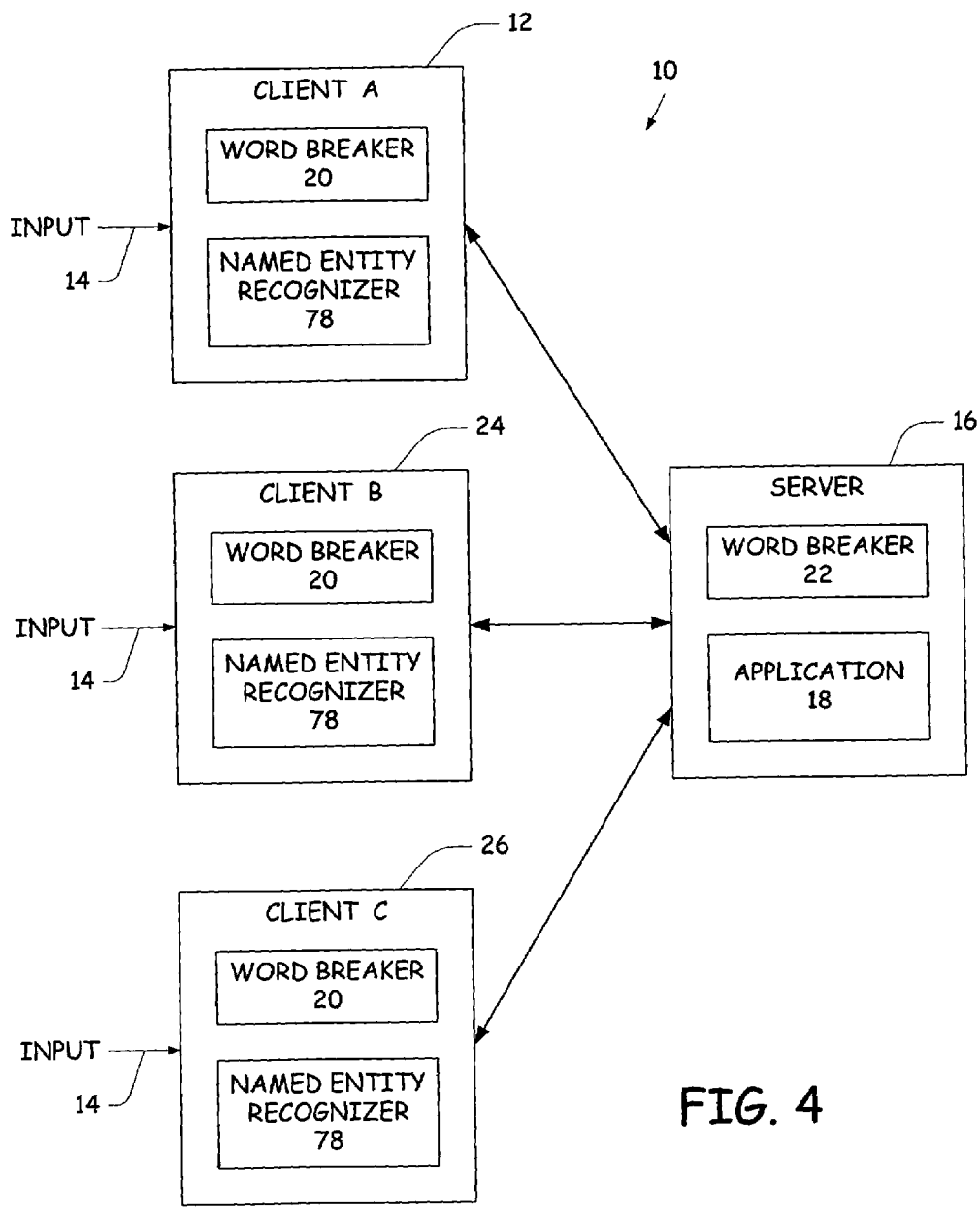
FIG. 4 is a block diagram of a client-server environment.

Referring to FIG. 4, a client-server system 10 includes a client machine or device 12 that receives an input 14 from a user not shown. The client machine 12 is operably connected to exchange information with a remote server 16, wherein the server 16 provides a service via an application 18 executed on the server 16 based on information received from the client 12.

As will be discussed below, client machine 12 may include a word-breaker module 20 configured to receive the input 14 from the user, typically in the form of a query, and generate therefrom tokens used by and provided to server 16 in order to complete a task such as but not limited to information retrieval. As used herein a "query" is any instruction based on the user's input to initiate a task such as but not limited to providing a command or an inquiry.

The tokens may also be required to be used on the client machine 12 and the word-breaker output from module 20 must be consistent with an output from a remote word-breaker module 22, herein illustrated as being part of server 16, but this illustration also represents being located remote from but addressable by server 16. In order for the client machine 12 to be able to pass usable information to the server 16, the token boundaries used by modules 20 and 22 are commonly identical, or at least identical enough to provide satisfactory results to the user.

Typically, server 16 is addressable and configured to operate with more than one client machines, which is illustrated in FIG. 4 where client machines 24 and 26 are also illustrated communicating with server 16. As appreciated by those skilled in the art, the server 16 can be addressable through a wide area network such as the Internet, or where the server 16 and the client machines 12, 24 and 26 are part of a local area network. The connections between the client machines 12, 24 and 26 with the server 16 can be formed with direct, "wired" connections, "wireless" connections or combinations thereof.

Figure 1:
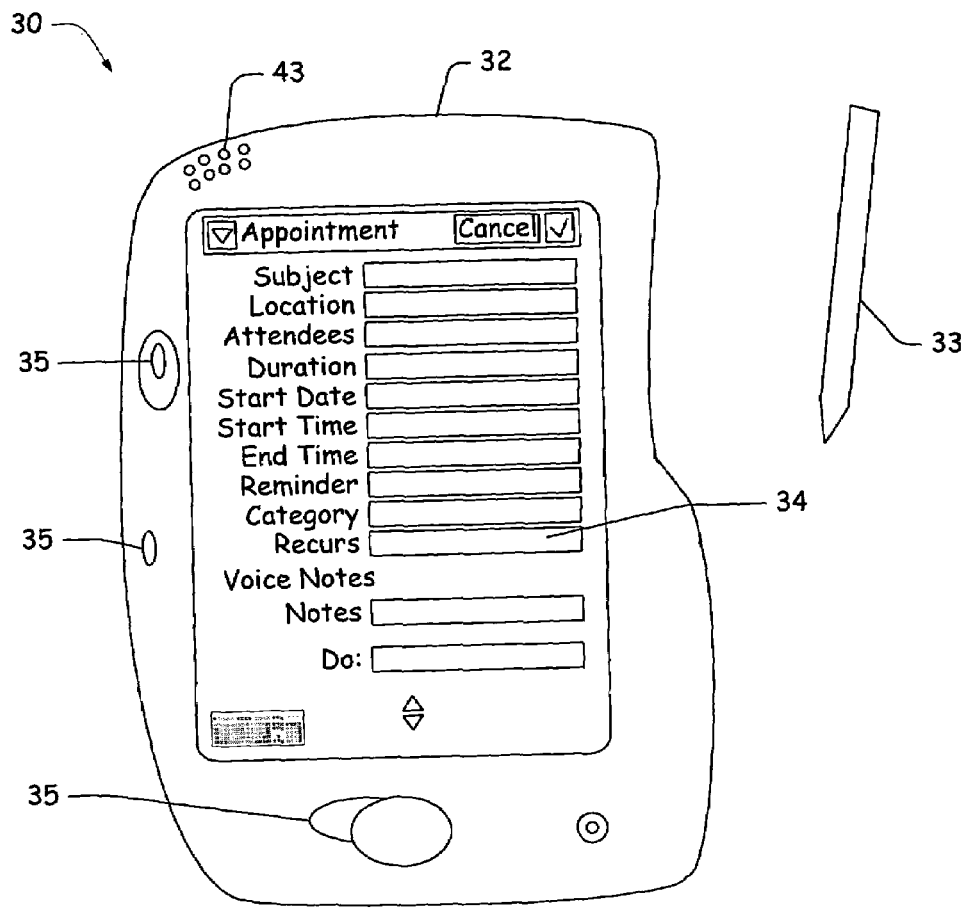
FIG. 1 is a top plan view of an embodiment of a computing environment.

Before describing further aspects, it may be useful to describe generally computing devices that can function in client-server system 10. Referring now to FIG. 1, an exemplary form of a data management device (PIM, PDA or the like) is illustrated at 30. However, it is contemplated that other computing devices can also be used. For example, phones and/or other data management devices can also benefit from concepts herein described. Accordingly, it is not intended that the scope of the client-server system 10 herein described be limited by the disclosure of the exemplary data management or PIM device herein illustrated.

The computing device 30 includes a housing 32 and has a user interface including a display 34, which uses a context sensitive display screen in conjunction with a stylus 33. The stylus 33 is used to press or contact the display 34 at designated coordinates to select a field, to selectively move a starting position of a cursor, or to otherwise provide command information such as through gestures or handwriting. Alternatively, or in addition, one or more buttons 35 can be included on the device 30 for navigation. In addition, other input mechanisms such as rotatable wheels, rollers or the like can also be provided. However, it should be noted that the device 30 is not intended to be limited by these forms of input mechanisms. For instance, another form of input can include voice recognition, if desired.

Figure 2:
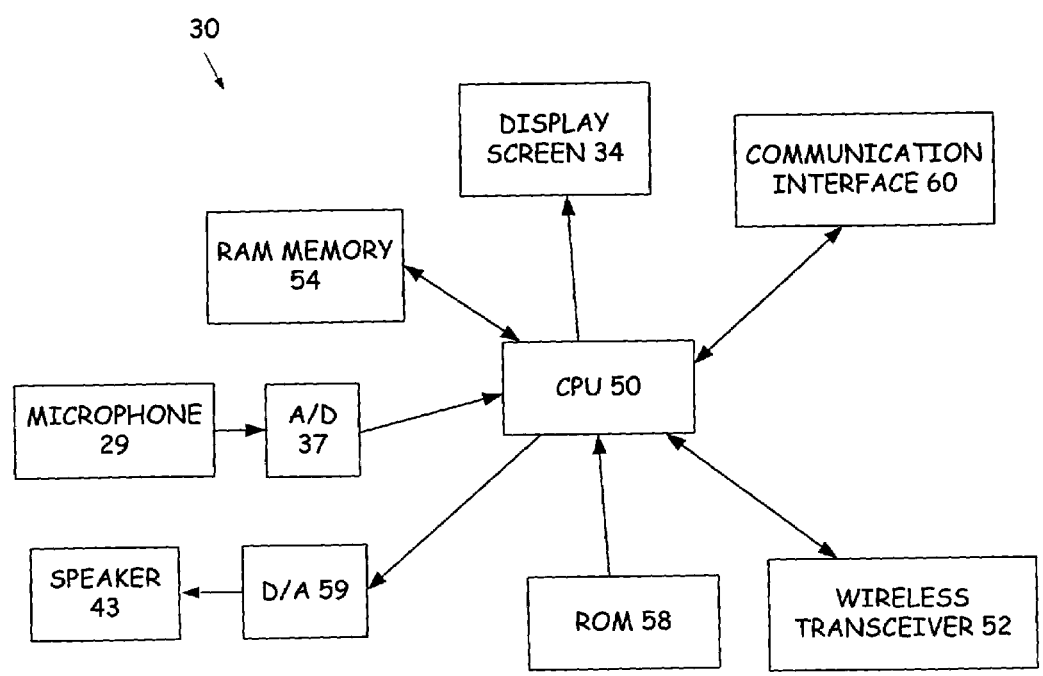
FIG. 2 is a block diagram of the embodiment of FIG. 1.

Referring now to FIG. 2, a block diagram illustrates functional components comprising the computing device 30. A central processing unit (CPU) 50 implements the software control functions. CPU 50 is coupled to the display 34 so that text and graphic icons generated in accordance with the controlling software appear on the display 34. A speaker 43 can be coupled to CPU 50 typically with a digital-to-analog converter 59 to provide an audible output. Data that is downloaded or entered by the user in to device 30 is stored in a non-volatile read/write random access memory store 54 bi-directionally coupled to the CPU 50. Random access memory (RAM) 54 provides volatile storage for instructions that are executed by CPU 50, and storage for temporary data, such as register values. Default values for configuration options and other variables are stored in a read only memory (ROM) 58. ROM 58 can also be used to store the operating system software for the device 30 that controls the basic functionality of the device 30 and other operating system Kernel functions (e.g., the loading of software components into RAM 54).

RAM 54 also serves as storage for code in the manner analogous to the function of a hard drive on a PC that is used to store application programs. It should be noted that although non-volatile memory is used for storing the code, it alternatively can be stored in volatile memory that is not used for execution of the code.

Wireless signals can be transmitted/received by the mobile device through a wireless transceiver 52, which is coupled to CPU 50. An optional communication interface 60 can also be provided for downloading data directly from a computer (e.g., desktop computer), or from a wired network, if desired. Accordingly, interface 60 can comprise various forms of communication devices, for example, an infrared link, modem, a network card, or the like.

Device 30 includes a microphone 29, and analog-to-digital (A/D) converter 37, and an optional recognition program (speech, DTMF, handwriting, gesture or computer vision) stored in store 54. By way of example, in response to audible information, instructions or commands from a user of device 30 generated speech signals that are digitized by A/D converter 37. A speech recognition program executed on device 30 or remotely can perform normalization and/or feature extraction functions on the digitized speech signals to obtain intermediate speech recognition results. Using wireless transceiver 52 or communication interface 60, speech data can be transmitted to a remote recognition server, not shown, wherein the results of which are provided back to device 30. Alternatively, recognition can be performed on device 30. Similar processing can be used for other forms of input, for example, handwriting recognition.

Figure 3:
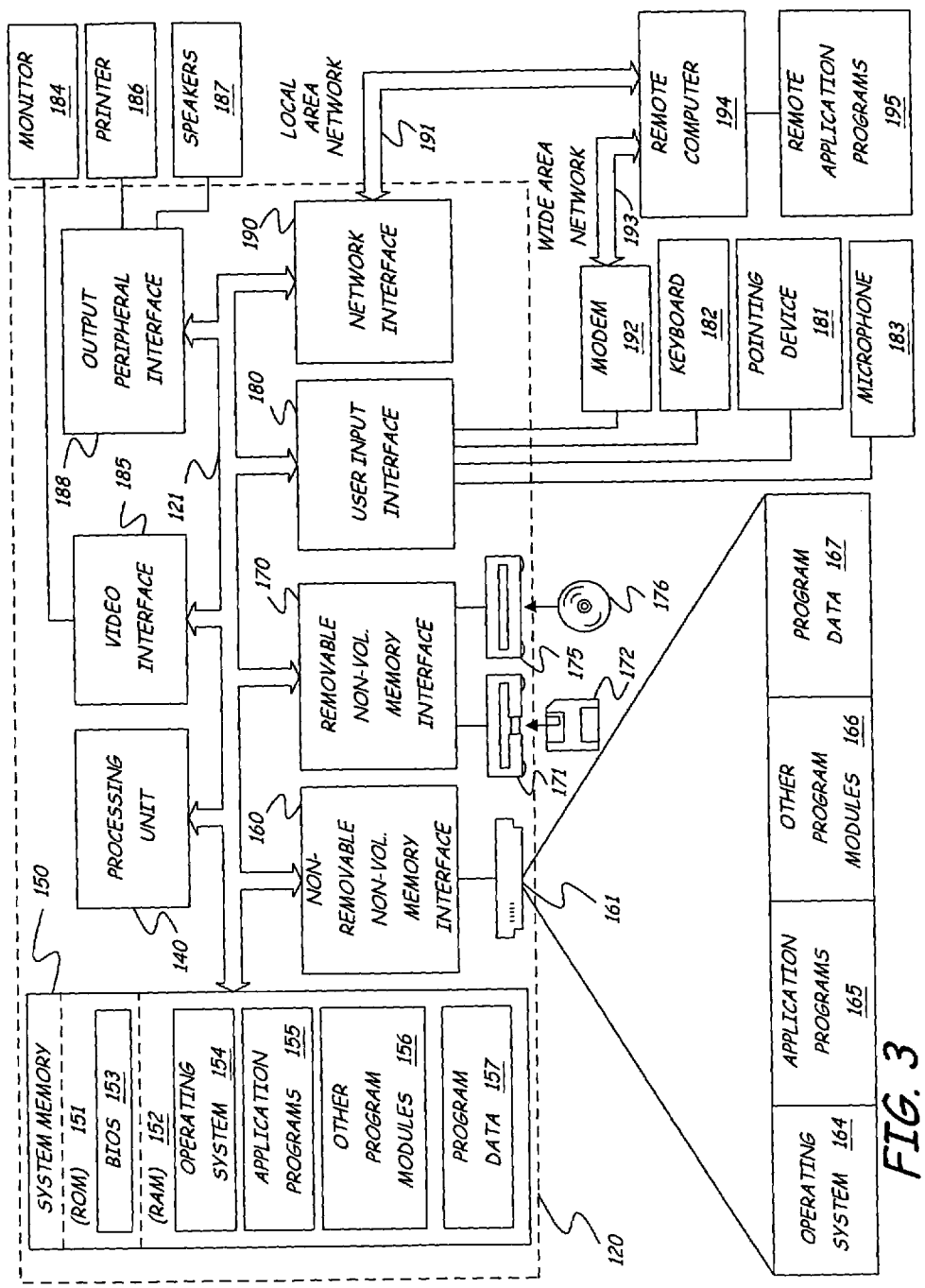
FIG. 3 is a block diagram of a second embodiment of a computing environment.

FIG. 3 illustrates another example of a suitable computing system environment 100 on which the concepts herein described may be implemented. The computing system environment 100 is again only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

In addition to the examples herein provided, other well known computing systems, environments, and/or configurations may be suitable for use with concepts herein described. Such systems include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The concepts herein described may be embodied in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below.

The concepts herein described may also be practiced in distributed computing environments where tasks are performed by remote processing devices that are linked through a communications network. In a distributed computing environment, program modules may be located in both locale and remote computer storage media including memory storage devices.

With reference to FIG. 3, an exemplary system includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a locale bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 3 illustrates operating system 134, application programs 135, other program modules 136, and program data 137.

The computer 110 may also include other removable/non-removable volatile/nonvolatile computer storage media. By way of example only, FIG. 3 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 3, provide storage of computer readable instructions, data structures, program modules and other data for the computer 110. In FIG. 3, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 3 include a locale area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 3 illustrates remote application programs 185 as residing on remote computer 180. It will be appreciated that the network connections shown are exemplary and other means of establishing a communications link between the computers may be used.

It should be noted that the concepts herein described can be carried out on a computer system such as that described with respect to FIG. 3. However, other suitable systems include a server, a computer devoted to message handling, or on a distributed system in which different portions of the concepts are carried out on different parts of the distributed computing system.

As indicated above, one aspect includes an explicit or implicit agreement about the word-breaker modules 20 and 22 in system 10 in order to provide a consistent indexing and retrieval task for an application in the client-server computing environment 10. A further aspect is that the client and server machines of system 10 must agree upon a set of word-breaking boundaries prior to use of the tokens on the client machine 12, if such tokens are to be used by the client machine 12. Additionally, the word-breaking boundaries must be consistent with what the word-breaker module (herein represented by module 22) used for indexing would produce.

To illustrate at least some of the aspects stated above, an exemplary, but innovative and useful named entity recognition scenario will be discussed. In this scenario, the server 16 can process queries from client machine 12 based on input 14 in order to accomplish various tasks. For instance, using English by way of example only, client machine 12 can receive as input 14 a phrase like "send mail to abc", which upon successful interpretation would map to a task "Send-Mail" with a slot "To" filled in with the email address of "abc", for example, "abc@xyz.com". In this scenario, it is assumed that server 16 does not have the capability to recognize that "abc" maps to email address "abc@xyz.com".

Rather, this information resides only on client machine 12. In particular the client machine 12 is able to recognize "abc" as a possible named entity mapping for "abc@xyz.com". The client machine 12 can then pass this email information back to the server 16 for further processing.

In FIG. 4 as illustrated, client machine 12 includes a named entity recognition module 78 to process one or more of the tokens as described above by accessing information contained within module 78 and or in another location such as a database having a list of named entities, for example, a "contacts" list of the user.

With reference to FIGS. 5, 6, 7 and 8, methods are provided illustrating cooperation of client machine 12 and server 16 to properly interpret "send email to abc" as "send email to abc@xyz.com".

Figure 8:
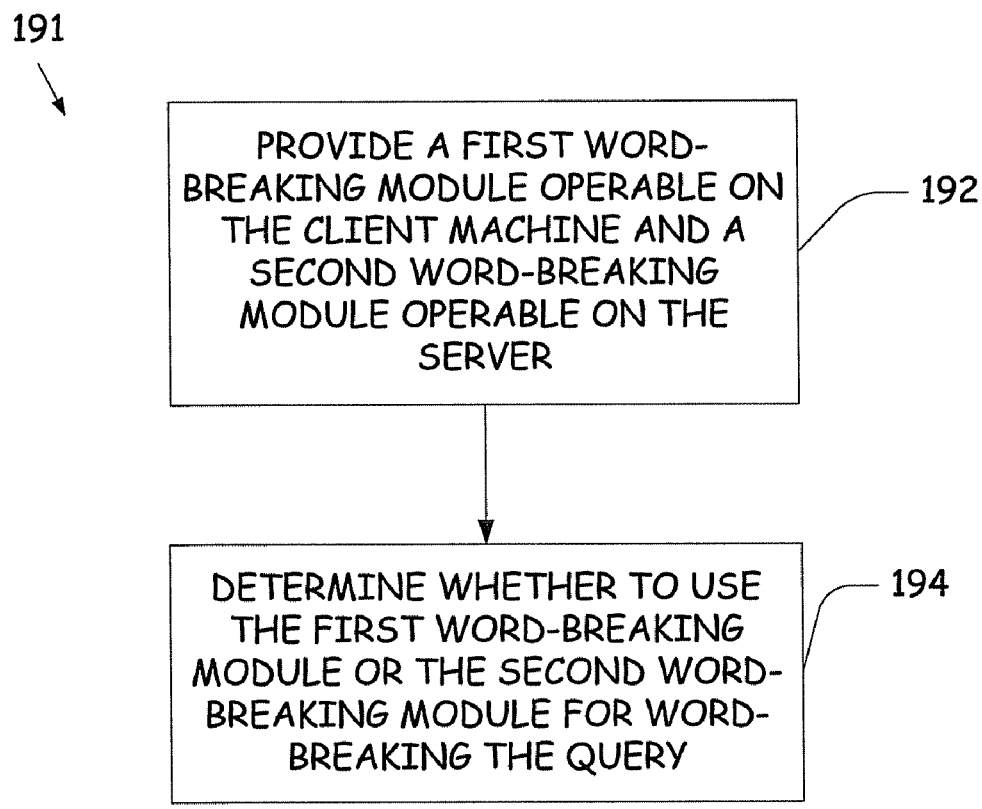
FIG. 8 is a flow chart illustrating a method for determining word-breaking between a client and a server.

FIG. 8 generally illustrates a method 191 used to form the agreement about which of the word-breaker modules 20 and 22 will be used to perform word-breaking of the query. Step 192 provides the first word breaking module 20 operable with the client machine 12 and the second word breaking module 22 operable with the server 16. At step 194, it is determined whether to use the first word breaking module 20 and/or the second word breaking module 22 to perform word-breaking of the query received by the client machine 12. However, it should be noted that in the event there is a difference between word-breaking modules 20 and 22, use of the word-breaking module 22 on the server is preferred, if not required, since word-breaking of the query should be in accordance with the word-breaking used to index the documents.

Figure 5:
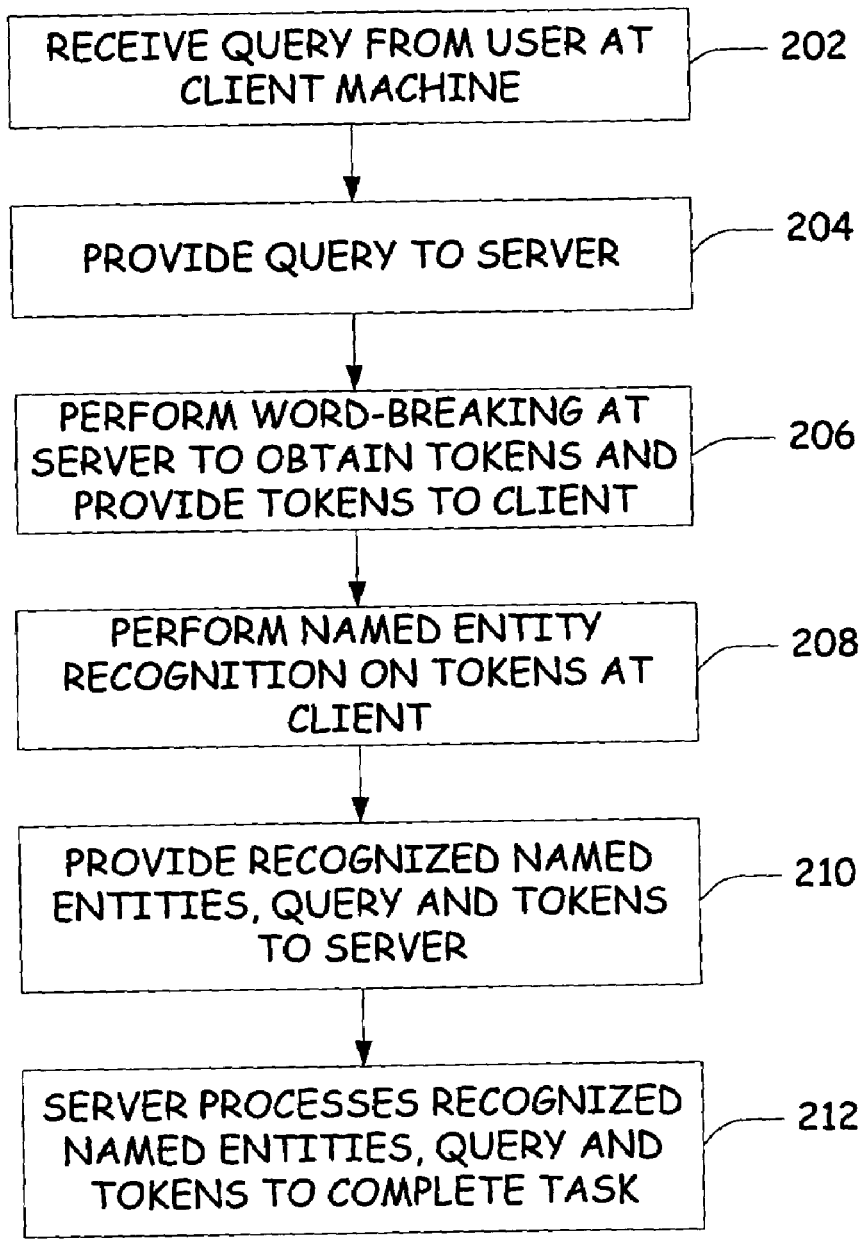
FIG. 5 is a flow chart illustrating a first method for processing a query.
Figure 6:
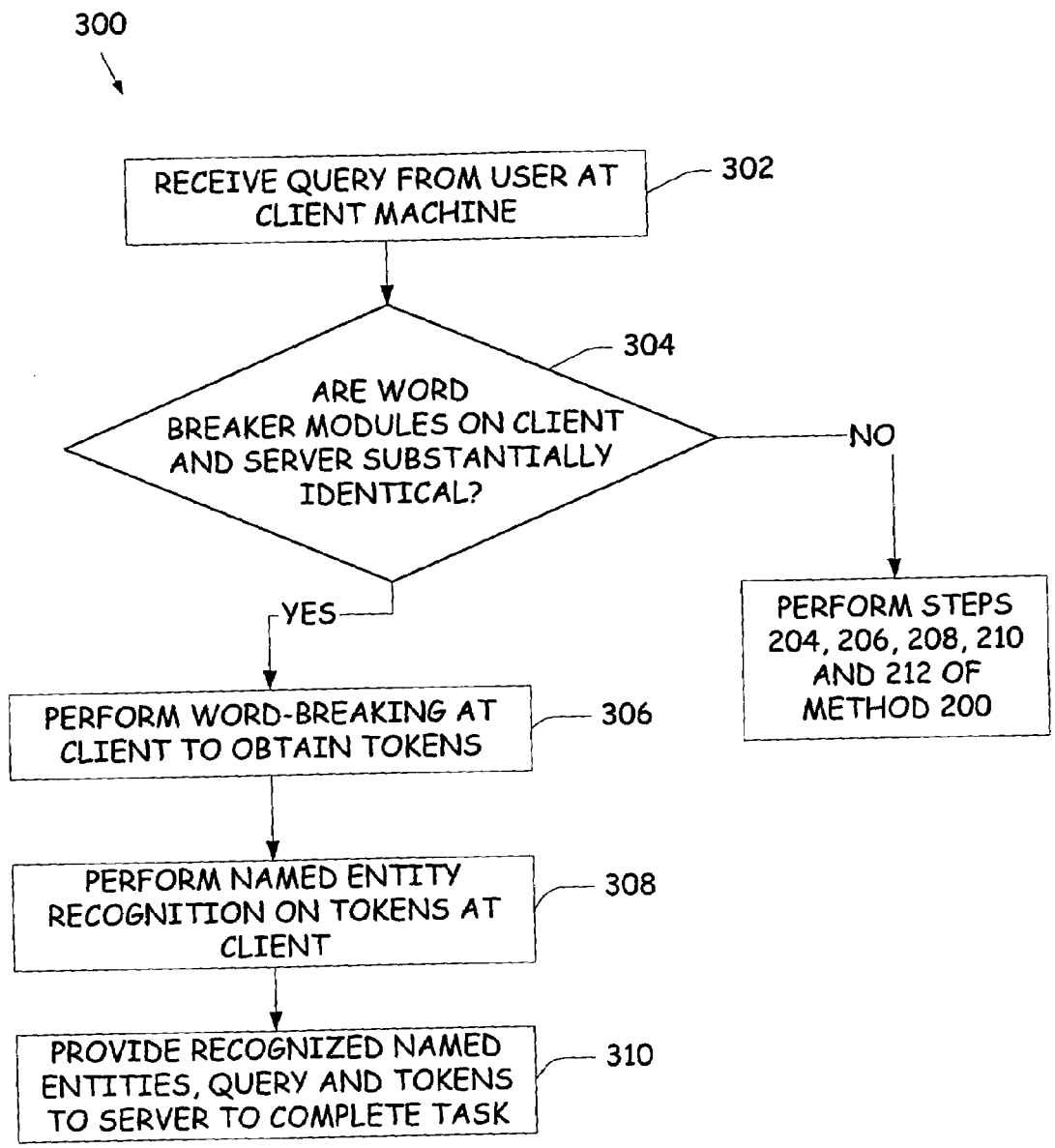
FIG. 6 is a flow chart illustrating a second method for processing a query.
Figure 7:
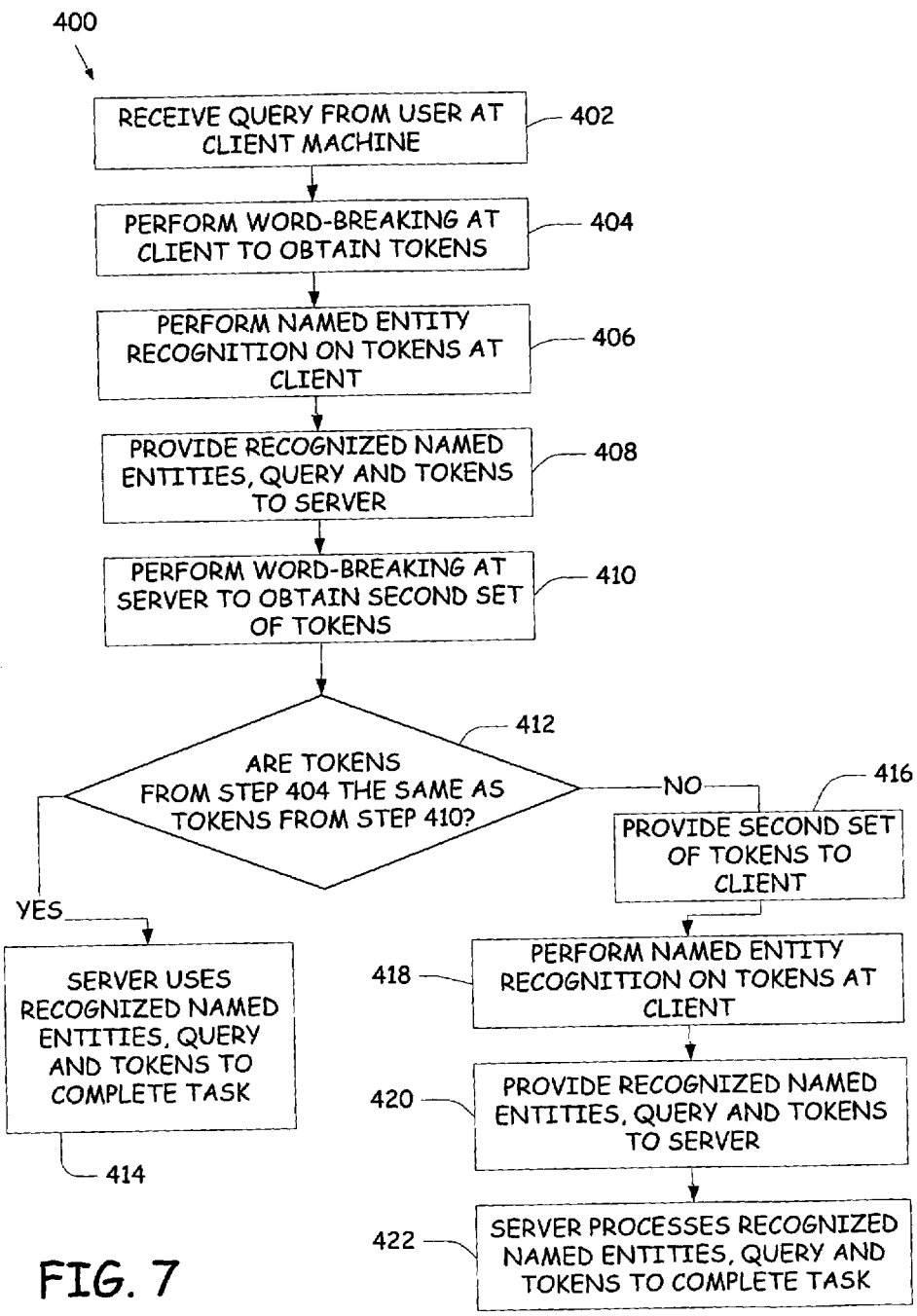
FIG. 7 is a flow chart illustrating a third method for processing a query.

FIGS. 5-7 illustrate steps to accomplish the step 194 of FIG. 8 in addition to other steps to receive and process the query for completeness. Referring first to FIG. 5, a method 300 includes receiving the query "send email to abc" based on the user input 14 to client machine 12 at step 202. At step 204 the query "send email to abc" is passed to the server 16. The server 16 performs word-breaking with module 22 and passes the set of tokens ("send", "email", "to", "abc") back to the client machine at step 206. The server 16 performs the word-breaking either based on an explicit agreement between the client 12 and the server 16 if both the client machine 12 and the server 16 have word breaking modules, or implicitly when the client machine 12 lacks any word breaking module.

At step 208 the client machine 12 determines if any of the tokens received correspond to known entities of client machine 12 using named entity recognition module 78. Named entity recognition modules are well-known and need not be further explained for purposes of this description. Thus, it is sufficient to state that named entity recognition module 78 maps token "abc" to email address "abc@xyz.com".

At step 210 client machine 12 returns information regarding recognized any named entity back to server 16 for further processing. For instance, the client machine 12 can return back to the server 16 information including the original set of tokens generated by the server 16, the original query, and an indication that the token "abc" maps to email address "abc@xyz.com". In this exemplary example, it is assumed that the server 16 can serve a number of client machines as illustrated in FIG. 1, and therefore, the server 16 does not retain the set of tokens determined at step 206, but rather, relies on the client machine 12 to provide the set of tokens for further processing. In alternative embodiments, return of the query and the tokens may not be necessary. The actual processing by the server 16 to complete a task for the client machine 12 is not relevant to the concepts described herein other than that the server may use any or all of the set of tokens, query and information related to identified named entities to complete the task.

At this point it should be noted that the server 16 may also include one or more named entity recognizers to identify other named entities in the set of tokens. This is particular beneficial when the data pertinent to the other named entities is stored on the server 16 and not on the client machine 12. In other words, the set of tokens may be distributed to any number of computing devices that have the corresponding information, and thus, can identify named entities in the query. The server 16 would then receive the identified named entity information from any computing device processing the set of tokens in order to complete the task. This concept is further explained in co-pending application entitled "Distributed Named Entity Recognition Architecture" filed on even date herewith and assigned Ser. No. 11/249,982.

A second method for processing is illustrated in FIG. 6 as 300. As with method 200 illustrated in FIG. 5, the client machine 12 receives the query at step 302. At step 304, the word-breaking modules 20 and 22 are compared with each other. Comparison can include but is not limited to comparing identifiers of the modules or the type of word-breaker modules as well as the specific versions such as indicated by time stamp associated as to when they were created. It should be noted that steps 302 and 304 can be reversed, if desired. Also, as appreciated by those skilled in the art, step 304 need only be performed once in a given query session since the word breakers are unlikely to change during the session.

At step 306, if the word-breaking modules 20 and 22 are deemed identical or sufficiently identical, word-breaking module 20 performs word-breaking to generate the set of tokens which are then used by named entity recognition module 78. The requisite information needed for performing the desired task is then provided to server 16 for further processing. As indicated above and by way of example, the requisite information can include the original query, the set of tokens generated by word-breaker module 20, and information related to recognized named entities, herein having corresponding email addresses.

If however as indicated at step 308, word-breaking modules 20 and 22 are not found to be sufficiently identical, processing can continue in accordance with that described above and illustrated in FIG. 5.

FIG. 7 illustrates yet another method 400 for processing the query. At step 402, a query is received by the client machine 12 from the user. At step 404, the client machine 12, using word-breaker module 20, performs word-breaking to generate a set of tokens. Using the set of tokens, the client machine 12 uses the named entity recognition module 78 to identify named entities on client machine 12. At step 408 the client machine 12 provides to the server 16 the query, the set of tokens obtained from the query, and the information pertaining to the recognized named entities. The server 16 receives this information and subsequently performs word-breaking upon the original query in order to generate its own set of tokens.

At step 412, a comparison is made between the tokens generated by word-breaking module 20 on the client-machine 12 and the tokens generated by the word-breaking module 22 on the server 16. (Commonly although not exclusively, this step is performed by the server 16.) If the tokens match, it is implied that the word-breaking modules 20 and 22 are sufficiently identical to further process the information received at step 410 to complete the task. If however, the set of tokens do not match, the set of tokens generated by the server 16 using word-breaking module 22 is returned to the client machine 12. At step 412, the client machine uses the set of tokens generated by the server 16 to perform named entity recognition using named entity recognition module 78. At step 414, the client machine 12 returns the requisite information such as the original query, the set of tokens generated by the server 16 using module 22, and information indicating the recognized named entities.

In summary, a framework is provided for ensuring that queries provided by a client can be processed to realize the task intended in a client-server environment. In particular, a method is provided to determine where word-breaking is to be performed using explicit or implicit agreements. Named entity recognition can then be performed on the tokens generated from the query, where for example the tokens can be provided to the client machine for named entity recognition thereon for data unique or otherwise not known to the server.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of performing word-breaking in a client-server environment, the method comprising:
    providing a first word breaking module with first word breaking boundaries operable with a client machine in the client-server environment and a second word breaking module with second word breaking boundaries operable with a server in the client-server environment;
    determining whether to use the first word breaking module and/or the second word breaking module to perform word breaking of a query received by the client machine depending upon whether the first and second word breaking boundaries would provide the same word breaking of the query;
    performing word breaking of the query to obtain a set of tokens using at least one of the first word breaking module and the second word breaking module; and
    wherein the step of providing includes providing a named entity recognizer operable with the client machine, and the method further comprises performing named entity recognition on the client machine using the named entity recognizer to identify named entities known to the client machine, but not known to the server.

2. The computer-implemented method of claim 1 and further comprising providing information related to the identified named entities to the server.

3. The computer-implemented method of claim 2 and further comprising providing the query and the set of tokens to the server in order for the server to complete a task.

4. The computer-implemented method of claim 1 and further comprising providing the set of tokens to the client machine.

5. The computer-implemented method of claim 1 wherein determining includes determining if the first and second word breaking modules are substantially identical.

6. The computer-implemented method of claim 5 and further comprising performing word breaking of the query to obtain a set of tokens using the first word breaking module if the first and second word breaking modules are substantially identical, and performing word breaking of the query to obtain the set of tokens using the second word breaking module if the first and second word breaking modules are not substantially identical.

7. The computer-implemented method of claim 6 wherein the step of providing includes providing a named entity recognizer operable with the client machine, and the method further comprises performing named entity recognition on the client machine using the named entity recognizer to identify named entities known to the client machine, but not known to the server.

8. The computer-implemented method of claim 7 and further comprising providing information related to the identified named entities to the server.

9. The computer-implemented method of claim 1 and further comprising performing word breaking of the query to obtain a first set of tokens using the first word breaking module and performing word breaking of the query to obtain a second set of tokens using the second word breaking module.

10. The computer-implemented method of claim 9 wherein the step of determining comprises comparing the first set of tokens with the second set of tokens to determine if any differences exist in the sets.

11. The computer-implemented method of claim 10 wherein the step of providing includes providing a named entity recognizer operable with the client machine, and the method further comprises performing named entity recognition on the client machine using the named entity recognizer to identify named entities known to the client machine, but not known to the server, from the second set of tokens if the differences exist between the first set of tokens and the second set of tokens, or performing named entity recognition on the client machine using the named entity recognizer to identify named entities known to the client machine, but not known to the server, from the first set of tokens if no differences exist between the first set of tokens and the second set of tokens.

12. The computer-implemented method of claim 11 and further comprising providing information related to the identified named entities to the server.

13. A computer-implemented method of performing word-breaking and named entity recognition in a client-server environment, the method, comprising:
    receiving a query at a client machine;
    providing the query to a server;
    performing word-breaking of the query on the server to obtain a first set of tokens comprising words of the query;
    performing word-breaking of the query on the client machine to obtain a second set of tokens comprising words of the query;
    determining whether to utilize the first or second set of tokens depending upon whether there are differences in the first and second set of tokens;
    selecting the first set of tokens if there are differences in the first and second set of tokens;
    selecting the second set of tokens if there are no differences in the first and second set of tokens;
    performing named entity recognition on the client machine to identify one or more named entities in the selected set of tokens and data accessible to the client machine;
    providing at least information related to the identified named entity to the server in order to complete a task.

14. The computer-implemented method of claim 13 and further comprising performing named entity recognition on the client machine using the first set of tokens if differences exist between the first set of tokens and the second set of tokens, or performing named entity recognition on the client machine using the second set of tokens if no differences exist between the first-mentioned set of tokens and the second set of tokens.

15. A computer-implemented method of performing word-breaking and named entity recognition in a client-server environment, the method, comprising:

providing a first client machine, a second client machine and a server in communication over a network with both the first client machine and the second client machine;

providing a first word breaking module operable with the first client machine in the client-server environment and a third word breaking module operable with the server in the client-server environment;

providing a second word breaking module operable with the second client machine in the client-server environment and the second word breaking module operable with the server in the client-server environment,;

receiving a first query at the first client machine requiring word breaking;

receiving a second query at the second client machine requiring word breaking;

performing word breaking on the first query utilizing the first client machine to generate a first set of tokens accessible to the first client machine by using the first word breaking module on the first client machine to identify words known to the first client machine;

performing word breaking on the second query utilizing the second client machine to generate a second set of tokens accessible to the second client machine by using the second word breaking module on the second client machine to identify words known to the second client machine;

performing word breaking on the first query utilizing the server to generate a third set of tokens and data accessible to the server by using the third word breaking module on the server to identify words known to the server;

performing word breaking on the second query utilizing the server to generate a fourth set of tokens and data accessible to the server by using the third word breaking module on the server to identify words known to the server;

comparing the first set of tokens to the third set of tokens and if different, transmitting the third set of tokens from the server to the first client machine to perform named entity recognition on the third set of tokens;

comparing the second set of tokens to the fourth set of tokens and if different, transmitting the fourth set of tokens from the server to the first client machine to perform named entity recognition on the fourth set of tokens;

completing a task on the first client machine using at least information related to the identified words from the first set of tokens if the first set of tokens and the third set of tokens are identical, or from the third set of tokens if the first set of tokens and the third set of tokens are different; and completing a task on the second client machine using at least information related to the identified words identified from the second set of tokens if the second set of tokens and the fourth set of tokens are identical, or from the fourth set of tokens if the second set of tokens and the fourth set of tokens are different wherein the task completed on the first client machine is different from the task performed on the second client machine.

16. The computer-implemented method of claim 15 and wherein the tokens are utilized to perform named entity recognition.

* * * * *